Figure 1:
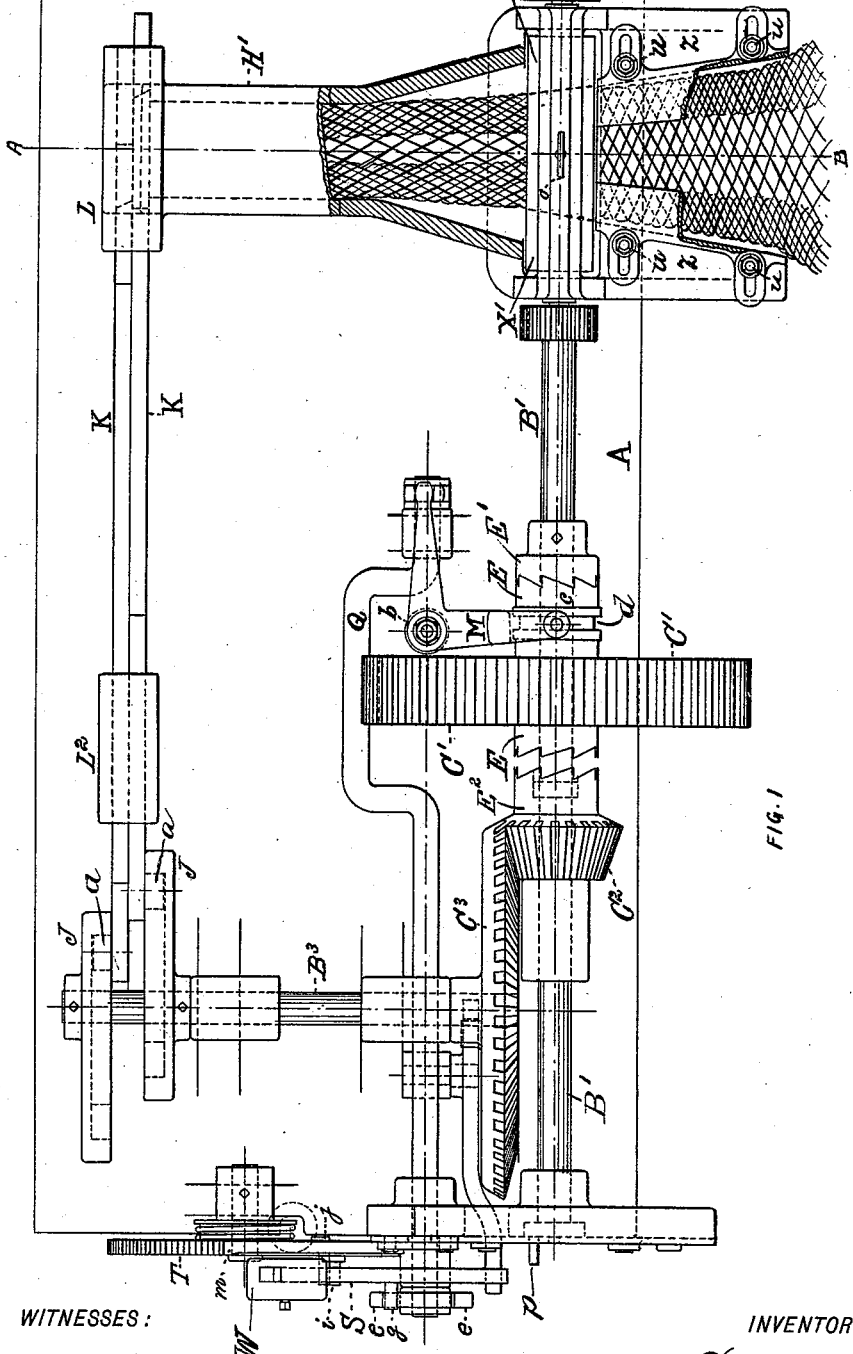

(No Model.) 4 Sheets—Sheet 1.
D. A. COBB.
MACHINE FOR MEASURING AND CUTTING TORSION BRAIDED WIRE INTO LENGTHS.
No. 555,638. Patented Mar. 3, 1896.

WITNESSES:
S. E. W. Bewley.
H. G. Garwood.

INVENTOR
Dewey A. Cobb.
BY Thomas J. Bewley.
ATTORNEY.

(No Model.) 4 Sheets—Sheet 2.
D. A. COBB.
MACHINE FOR MEASURING AND CUTTING TORSION BRAIDED WIRE INTO LENGTHS.
No. 555,638. Patented Mar. 3, 1896.
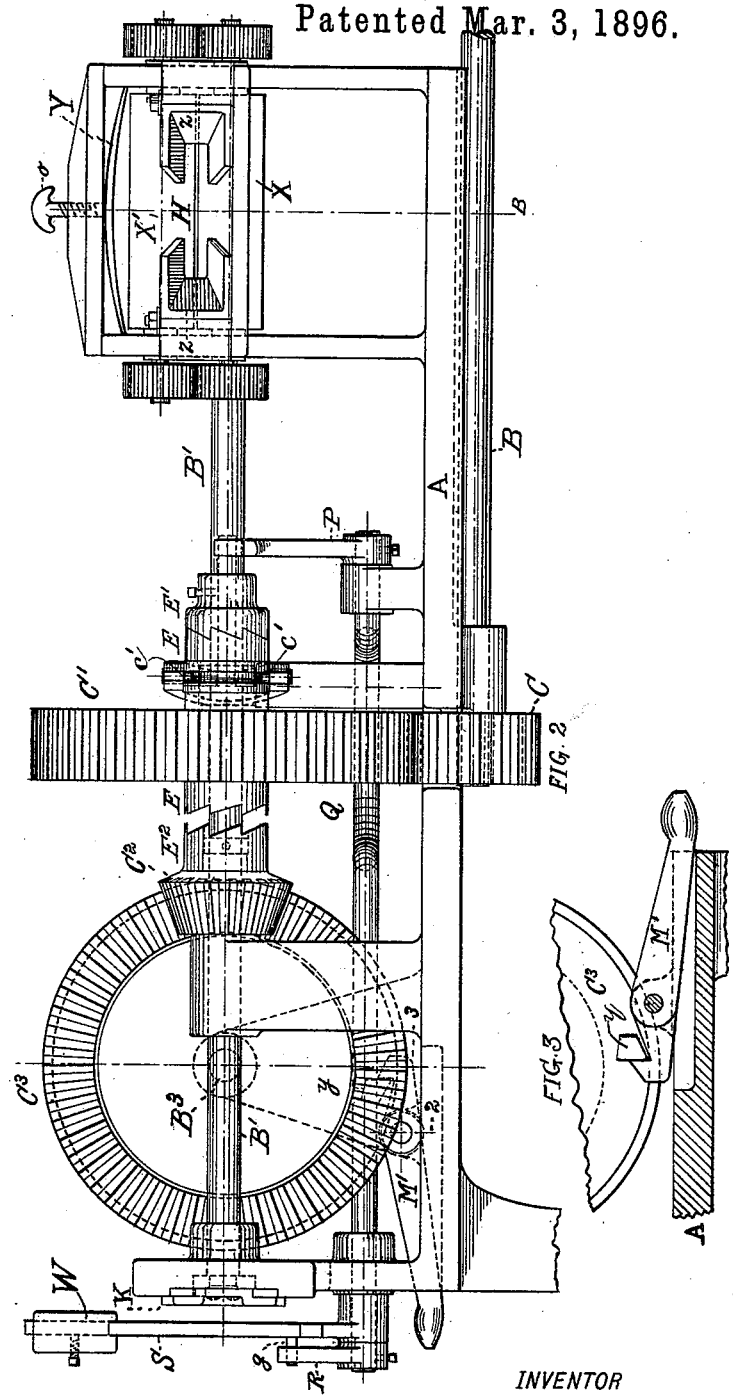
WITNESSES:
G. E. W. Bewley.
H. G. Garwood.
INVENTOR
Dewey A. Cobb.
BY
Thomas J. Bewley.
ATTORNEY.

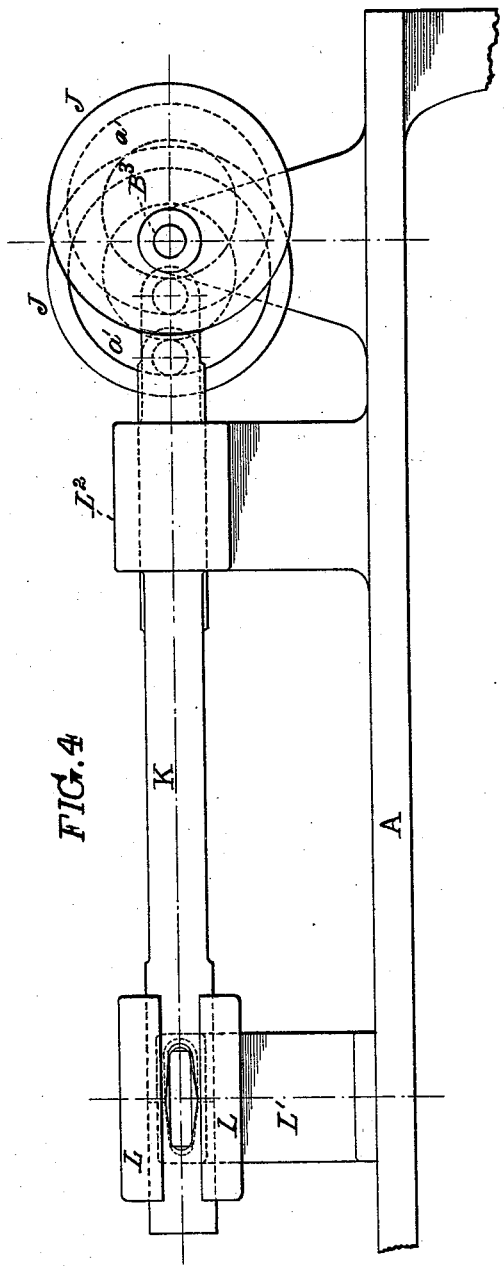

(No Model.) 4 Sheets—Sheet 4.

D. A. COBB.
MACHINE FOR MEASURING AND CUTTING TORSION BRAIDED WIRE INTO LENGTHS.

No. 555,638. Patented Mar. 3, 1896.

WITNESSES:
S. E. W. Bewley.
H. G. Garwood.

INVENTOR
Dewey A. Cobb.
BY Thomas J. Bewley,
ATTORNEY.

UNITED STATES PATENT OFFICE.

DEWEY A. COBB, OF PHILADELPHIA, PENNSYLVANIA.

MACHINE FOR MEASURING AND CUTTING TORSION BRAIDED WIRE INTO LENGTHS.

SPECIFICATION forming part of Letters Patent No. 555,638, dated March 3, 1896.

Application filed January 7, 1895. Serial No. 534,033. (No model.)

*To all whom it may concern:*

Be it known that I, DEWEY A. COBB, a citizen of the United States, residing at Philadelphia, in the county of Philadelphia and State of Pennsylvania, have invented certain new and useful Improvements in Machines for Measuring and Cutting Torsion Braided-Wire Springs into Lengths, of which the following is a specification.

The torsion braided-wire spring is the invention of Joseph L. Wells, for which Letters Patent were granted to him on the 23d day of February, A. D. 1886, and numbered 336,774.

The torsion braided-wire spring is delivered from the machine which manufactures it in a continuous length of braid produced from the series of interwoven wires, which it is then necessary to divide into sections of requisite length for the purposes desired.

In the manufacture of the sections of the torsion braided-wire springs into mattresses, cushions, &c., it has heretofore been found difficult to determine and measure with any degree of accuracy the requisite lengths of the braided-wire sections required specifically for the purpose desired, the spring by reason of its elastic properties being extremely mutable or inconstant in relation to any fixed position of required length.

The essential and main object of the present invention is to overcome the difficulties experienced in the division of the braid into sections, which are determined upon, and to insure in a positive manner that the sections of braid composing the completed mattress or cushion are of uniform length and that each section contains a corresponding length of material, thus presenting a uniformity and precision of length in construction. I accomplish these objects by compressing the braid together simultaneously upon all of its sides, thereby bringing all of the series of wires in contact with each other, thus extending the same longitudinally and rendering dormant the contained elasticity, and rendering them rigid, unyielding and inflexible.

The machine consists of an outwardly-flaring receiving-spout, into and through which the braided wire is drawn by a pair of compressing-rolls geared together to rotate with equal velocity, which compress the braid between them, also drawing the braid together laterally, which diminishes its width as it passes to and between the rolls, thereby rendering dormant all contained elasticity therefrom at the time and point of measurement. From the compressing-rolls the braid passes through a channel to a cutting device. The length of the sections of braid depends upon the number of revolutions imparted to the compressing-rolls between the successive actions of the cutting device, as will be more fully understood from the following detailed description and the four sheets of accompanying drawings, in which—

Figure 5:
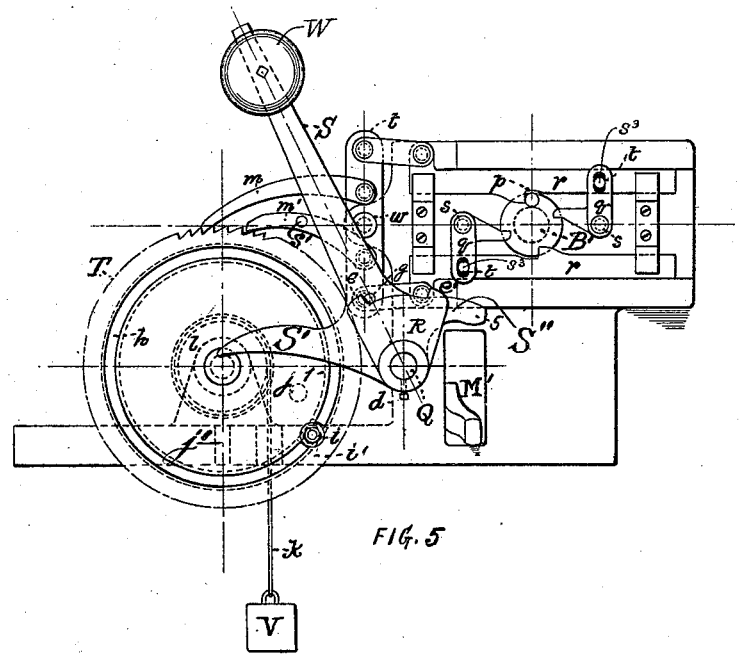
Figure 6:
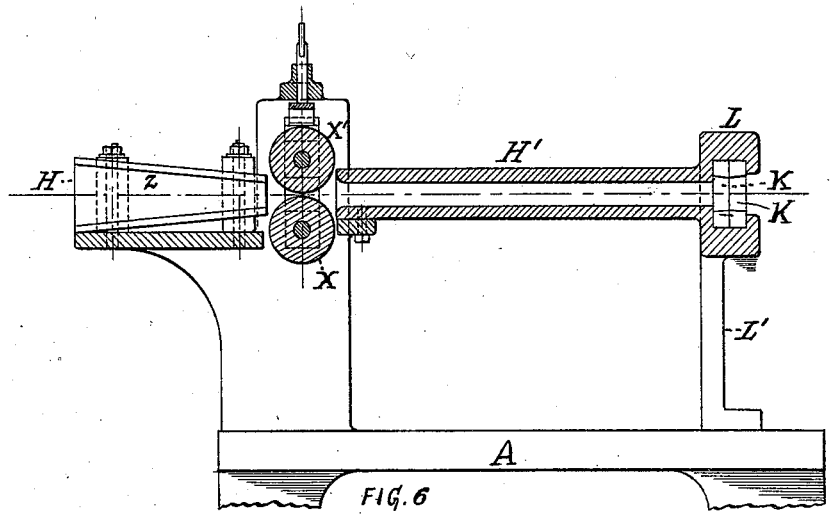

Figure 1, Sheet No. 1, represents a plan view of the machine with one end of the braid inserted in the spout and passing through the channel to the cut-off device. Fig. 2, Sheet No. 2, represents an end elevation of the machine. Fig. 3 is a view of a portion of the rear surface of the crown-wheel $C^3$, showing the lever M' in contact with the lug $y$ for retaining and releasing the wheel $C^3$, which actuates the clutches E and E' on the shaft B'. Fig. 4, Sheet No. 3, represents a rear elevation of the housings, cutting-knives K, and their operating-cams J J. Fig. 5, Sheet No. 4, is a side elevation of the mechanism for tripping the cutting-off device which severs the continuous length of braid into sections. Fig. 6 is a longitudinal section of the spout H, which receives the braid, the channel H', the compression-rolls X X', and the housing for the cutting-knives K K, which sever the continuous length of braided wire into sections.

Like letters and numerals of reference in all the figures indicate the same parts.

A is the bed, to which the parts of the operating mechanism is connected.

B is the driving-shaft for imparting motion to the mechanism by means of the spur-wheel C on the end thereof, which intermeshes with the cog-wheel C' on the shaft B' and running loosely thereon. On each end of the hub of the wheel C' is a clutch E, which engages alternately with the clutch E', fast on the shaft B', and with the clutch $E^2$, to which the spur-wheel $C^2$ is fast during the operation of the machinery which imparts motion to the intermeshing crown-wheel $C^3$. The clutch E' is made fast to the shaft B', which shaft when in motion actuates and rotates the compression-rolls X X', which flatten the tubular braid vertically after it has passed the receiving-spout H, which has adjustable sides, and is passed into the channel H'. These sides $z\ z$ are capable of being expanded or contracted in accommodation to the width of the braid and the required elongation of the woven mesh to assist in the correct measurement of sections to be severed by the knives.

The crown-wheel $C^3$ carries with it the shaft $B^3$, upon which are keyed the cams J J, which actuate the reciprocating knives K K, which cut the braid into sections of the requisite length. These knives are held in a stationary box L, supported in a pedestal L', attached to the standing frame of the machine.

$L^2$ is a box or guide in which the knife-bars move lengthwise in their reciprocating actions and is part of the standing frame, and serves the purpose of steadying said bars. Reciprocating motion is transmitted through the bars to the knives K for severing the woven braid into sections by means of the eccentric cams J J on the shaft $B^3$. The bars have roller-pins $a\ a$ revolving in channels $a'\ a'$ of said cams.

The loose gear-wheel C', sliding on the shaft B', is interlocked alternately with the clutches E' and $E^2$ by the action of the bell-crank lever M on the post $b$ by means of the yoke $c$ carrying the pins $c'\ c'$, which run in a groove $d$ in the hub of the wheel C', which hub is enlarged for the purpose. This bell-crank lever M is actuated by the short lever P, (see Fig. 2,) which is rigidly attached to the bar Q, and when said bar is caused to make a partial revolution upon its axis and similar return movement it interlocks alternately the clutches E' $E^2$ on said shaft B'. Motion is imparted to this bar Q by the mechanism shown clearly in Fig. 5 of the drawings, (Sheet No. 4,) where the end of the said bar is shown. Permanently secured thereon by means of the set-screw $d$ is the tappet R, having the upwardly-projecting prongs $e\ e$, between which the lug $g$ of the throw-over lever S is caused to traverse when it is actuated by the ratchet-wheel T, which wheel has a circular concentric channel $h$ in its outer face, into which channel the adjustable pin $i$ is secured by means of the nut $i'$. This ratchet-wheel has the stop $j$ projected from its inner surface, which comes into contact with a stud $j'$ projecting from the bed, and when the wheel is released by the throw-over lever S the pawls $m\ m'$ are thereby released from connection with the teeth or serrations on the periphery of said wheel T, it is out of action and is returned to the starting-point by the gravitation of the weight V attached to the end of the chain $k$, attached and encircling a spool $l$ upon the hub of the ratchet-wheel. An intermittent partial rotary motion is imparted to the ratchet-wheel by the action of the pawls $m\ m'$, which alternate in their action upon the serrations or teeth upon the periphery of said wheel T, and are caused to act in this manner by means of the pin $p$ on the end of the shaft B'. This intermittent motion is imparted to said wheel by the action of the pin $p$ upon two bell-crank levers $q\ q$ and the two sliding bars $r\ r$. The two bell-crank levers turn upon the studs $s\ s$ and are connected with said sliding bars by means of the pin $s^3$, projecting from said bars and passing through elongated slots $t\ t$ in the ends of the levers $q\ q$, (see Fig. 5,) which impart motion to thus operate the sliding bars $r\ r$.

The pin $p$ in its revolution with the shaft B', coming into contact successively with the bars $r\ r$ and their connecting-levers $q\ q$, imparts an oscillatory or rocking reciprocating motion to the bar $t$, which is pivoted upon the stud $w$, and thereby communicates forward motion to the pawls $m\ m'$ alternately, thus rotating the ratchet-wheel T by their action until the pin $i$, acting upon the arm S' of the lever S at the point 1, (see Fig. 5,) raises and throws said lever over to the right, thereby releasing the pawls $m\ m'$ from the notches on the periphery of the rim of the ratchet-wheel, when the gravitation of the suspended weight V draws the chain from around the hub of the wheel, thereby returning the latter to its original position. The ratchet-pawls $m\ m'$ are raised by the arm S' of the lever S by striking the pin $s'$ on the pawl $m'$, when the lever is thrown over to the right. The pawl $m'$, being directly under the pawl $m$, causes the latter also to rise.

M' is a lever pivoted at 2, shown in dotted line, (see Figs. 2 and 3,) the short end 3 of which is acted upon by a lug $y$, projected from the inner surface of the crown-wheel $C^3$, the longer end of which, coming into contact with the arm $S^2$ of the lever S, returns it to its first position and shifts the clutch from a connection with part $E^2$ to part E'.

X X' are a pair of compression-rolls, which are provided with gear-wheels on their extremities. The gears are of equal diameter and intermesh with each other, the roll X being fast on the shaft B'. These rolls serve the purpose of drawing in and reducing the braid in its passage to and through the spout H and into and through the channel H' to the cut-off or severing-knives K K. They also draw the braid together laterally and render dormant all elasticity in the series of wires at the time of contact therewith, and permit of an accurate determination of the length of sections of tube desired to be obtained in the division of the braid into sections. The adjustment of these compression-rolls to impart pressure upon the braid as it passes between them is effected by compression of the semielliptical spring Y by means of screw $o$, whose extremities bear upon the ends of the upper roller X'.

The lateral adjustment of the braid as it passes into and between the compression-rolls is effected by the extension or contraction of the sides $z$ $z$ of the spout. After passing the rolls it is prevented from expanding by the sides of the channel H'.

The operation of the machine is as follows: The end of the continuous length of braid is inserted in the spout H, whose sides (see Fig. 1) have been previously adjusted laterally to give the requisite compression thereto. It is then pressed inward until its end is caught between the revolving compression-rollers X X', which carry it forward and through the spout and into the channel H', whose walls prevent expansion until it has reached and passed the severing-knives K. When sufficient braid has passed through the channel H' for the formation of a spring, the movable pin $i$ in the concentric channel $h$ of the wheel T being set at such a point that it strikes the lower edge of the arm S' of the weighted lever S, and in the revolution of the wheel throws said lever over to the right from the position shown in Fig. 5, and carrying it until the arm S' comes into contact with the projecting pin $s'$ on the pawl $m'$, which lifts the pawls $m$ $m'$ from their contact with the teeth or serrations on the edge of the ratchet-wheel T, when said wheel returns to its first position by the action of gravitation of the weight V and its connecting-chain, partially wound around the hub $l$. This action of the lever S throws the bar Q to the right and carries with it the clutch E, bringing it into contact with the clutch $E^2$, at the same time releasing clutch E', when the compression-rollers X X' stop their action. This causes conjunction of the bevel gear-wheel $C^2$, loose on shaft B', with the crown-wheel $C^3$, and setting in motion the shaft $B^3$, carrying the cams J J, which, operating the reciprocating knives K K, sever the braid into sections. When the crown-wheel $C^3$ is completing one revolution, thus returning the knives to their open position, the lug $y$ then strikes the short and beveled end of the lever M', pressing it downward, thus causing the longer end of said lever to be lifted and bringing it into contact with the arm S" of lever S at the point 5, (see Fig. 5,) returning the lever to its first position, which allows the pawls $m$ $m'$ to fall into connection with the teeth of the ratchet-wheel T. Upon the return of the lever S the lug $g$ comes into contact with the stud on the tappet at $e$, rocking the bar Q, which disconnects the clutch $E^2$ and connects the clutch E'. This action completes the operation, which may be repeated *ad infinitum*.

The weight W upon the extremity of the lever S is for the purpose of maintaining it steady in the different positions it assumes to assist in operating the clutch.

Having thus described the construction and method of operation of my improved machine, what I claim therein as new, and desire to secure by Letters Patent, is—

1. The combination of the hopper, or receiving-spout H, and the channel H', for receiving the continuous length of wire braid, and the rotating feed-rolls X, X', with the reciprocating knives K, K, actuated by the cams J, J, on the shaft $B^3$, whereby all of the series of wires composing the continuous length of woven-wire braid are by simultaneous action compressed together upon all of the sides thereof, thus rendering the braid rigid, unyielding and inflexible when divided into sections by the reciprocating knives, substantially in the manner herein shown and described.

2. The rotating rolls, X X', on the shaft B', arranged to revolve a specified number of revolutions, so as to draw between them a given length of braid, with the ratchet-wheel T, and pawls $m$ $m'$, the lever S, having the projecting arm S', operated by the adjustable pin $i$, during the revolution of the wheel T, whereby the pin $i$, coming into contact with said arm S', releases the pawls $m$, $m'$, from their junction with the teeth on the periphery of said wheel T, for its return to the starting-point by means of the action of the chain $k$, around the hub $l$, and its suspended weight V, for actuating the wheel; whereby the length of braid passing between the rolls is determined; in combination with the reciprocating knives K, for severing the braid into sections, substantially in the manner herein shown and described.

DEWEY A. COBB.

Witnesses:
THOMAS J. BEWLEY,
J. R. MASSEY.